United States Patent
Gupta et al.

(10) Patent No.: US 9,560,577 B2
(45) Date of Patent: Jan. 31, 2017

(54) PHASED SEARCH FOR FEMTOCELLS

(71) Applicant: Broadcom Corporation, Irvine (CA)

(72) Inventors: Sudip Alexei Gupta, Hemel Hempstead (GB); Abhishek Pandit, Wokingham (GB)

(73) Assignee: Broadcom Corporation, Irvine, CA (US)

( * ) Notice: Subject to any disclaimer, the term of this patent is extended or adjusted under 35 U.S.C. 154(b) by 429 days.

(21) Appl. No.: 14/089,049

(22) Filed: Nov. 25, 2013

(65) Prior Publication Data

US 2015/0024742 A1 Jan. 22, 2015

Related U.S. Application Data

(60) Provisional application No. 61/900,496, filed on Nov. 6, 2013, provisional application No. 61/847,237, filed on Jul. 17, 2013, provisional application No. 61/859,874, filed on Jul. 30, 2013, provisional application No. 61/867,298, filed on Aug. 19, 2013.

(51) Int. Cl.
*H04W 4/00* (2009.01)
*H04W 48/16* (2009.01)
*H04W 84/04* (2009.01)

(52) U.S. Cl.
CPC .......... *H04W 48/16* (2013.01); *H04W 84/045* (2013.01); *Y02B 60/50* (2013.01)

(58) Field of Classification Search
CPC .. H04W 36/0083; H04W 48/18; H04W 36/14; H04W 36/24; H04W 84/045; H04W 48/20; H04W 36/00; H04W 36/08; H04J 11/0069; H04J 11/0073; H04J 11/0093; H04B 1/70735; H04B 1/70754
USPC .................... 455/434, 160.1, 161.1
See application file for complete search history.

(56) References Cited

U.S. PATENT DOCUMENTS

| | | | |
|---|---|---|---|
| 2011/0171909 A1* | 7/2011 | Jung ..................... | H04W 48/16 455/41.2 |
| 2012/0088505 A1* | 4/2012 | Toh ....................... | H04W 8/186 455/434 |
| 2012/0208556 A1* | 8/2012 | Jung ..................... | H04W 48/16 455/456.1 |
| 2013/0109395 A1* | 5/2013 | Szufarska ......... | H04W 36/0072 455/437 |

OTHER PUBLICATIONS

3GPP TS 36.304 v10.6.0 (Jun. 2012) Technical Specification; User Equipment (UE) procedures in idle mode, 3GPP, Valbonne, France, 2012, 33 pages.
3GPP TS 36.331 v10.11.0 (Sep. 2013 Technical Specification; Evolved Universal Terrestrial Radio Access (E-UTRA) Radio Resource Control (RRC), 3GPP, Valbonne, France, 2013, 308 pages.

(Continued)

*Primary Examiner* — Thai Vu

(74) *Attorney, Agent, or Firm* — Brinks Gilson & Lione

(57) ABSTRACT

User equipment (UE) includes an architecture for locating femtocells. The architecture implements a phased search approach. The phased search helps the UE find the correct femtocells in a time and power efficient manner, by performing the search in a way that matches the likely changes to femtocell configurations.

20 Claims, 7 Drawing Sheets

(56) References Cited

OTHER PUBLICATIONS

Section 5.2.4.3 Mobility States of a UE, 3GPP TS 36.304 v10.6.0 (Jun. 2012) Technical Specification; User Equipment (UE) procedures in idle mode, 3GPP, Valbonne, France, 2012, 1 page.

Section 5.5.6.2, Speed dependant scaling of measurement related parameters, 3GPP TS 36.331 v10.11.0 (Sep. 2013 Technical Specification; Evolved Universal Terrestrial Radio Access (E-UTRA) Radio Resource Control (RRC), 3GPP, Valbonne, France, 2013, 2 pages.

Kwak, H., et al., Mobility Management Survey for Home-eNB Based 3GPP LTE Systems, Journal of Information Processing Systems, vol. 4, No. 4, Dec. 2008, 8 pages.

UMTS frequency bands downloaded from Wikipedia (http://en.wikipedia.org/wiki/UMTS_frequency_bands), Nov. 9, 2013, 6 pages.

* cited by examiner

PHASED SEARCH FOR FEMTOCELLS

PRIORITY CLAIM

This application claims priority to: U.S. Provisional Application Ser. No. 61/900,496, filed 6 Nov. 2013, U.S. Provisional Application Ser. No. 61/847,237, filed 17 Jul. 2013, U.S. Provisional Application Ser. No. 61/859,874, filed 30 Jul. 2013, and U.S. Provisional Application Ser. No. 61/867,298, filed 19 Aug. 2013, all of which are entirely incorporated by reference.

TECHNICAL FIELD

This disclosure relates to femtocells and facilitating wireless communication device connection to femtocells.

BACKGROUND

Rapid advances in communication technologies, driven by immense customer demand, have resulted in the widespread adoption of mobile communication devices. Many of these devices, e.g., smartphones, have sophisticated wireless connectivity options. In addition to fundamental voice call connectivity with base stations serving very large numbers of subscribers is another connection option: connecting to femtocells within, e.g., a 3G network. The femtocells typically support fewer subscribers, but may provide call quality, cost, bandwidth, or other advantages to those subscribers.

DETAILED DESCRIPTION

Figure 1:
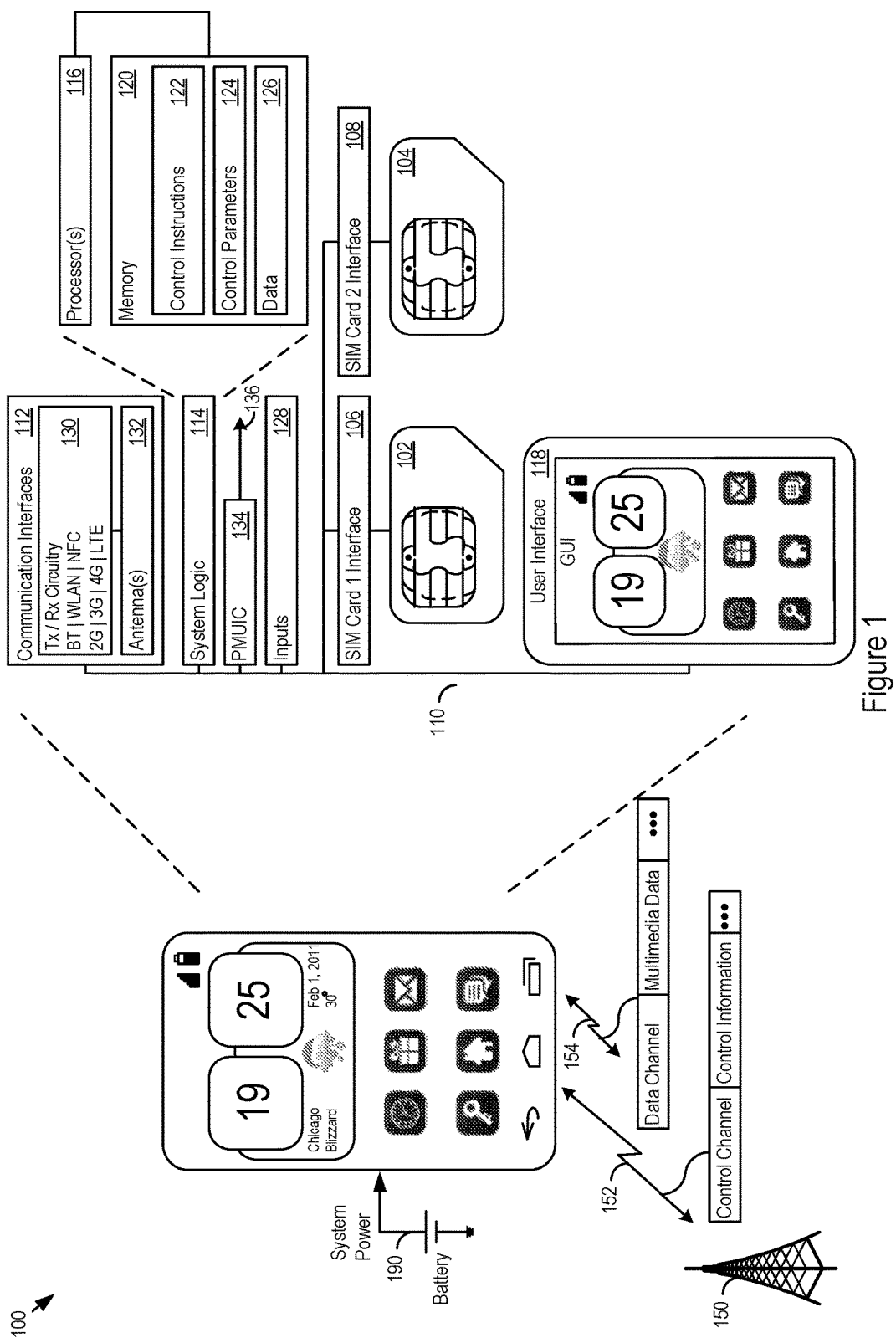
FIG. 1 shows an example of user equipment.

FIG. 1 shows an example of user equipment 100 ("UE 100"). The UE 100 is a smartphone in this example, but the UE may be any electronic device. The techniques described below regarding femtocells may be implemented in a wide array of different types of devices. Accordingly, the smartphone example described below provides just one example context for explaining the femtocell connection and communication techniques.

As one example, UE may be a 2G, 3G, or 4G/LTE cellular phone capable of making and receiving wireless phone calls, and transmitting and receiving data using 802.11 a/b/g/n/ac/ad ("WiFi"), Bluetooth (BT), Near Field Communications (NFC), or any other type of wireless technology. The UE may also be a smartphone that, in addition to making and receiving phone calls, runs any number or type of applications. UE may, however, be virtually any device that transmits and receives information, including as additional examples a driver assistance module in a vehicle, an emergency transponder, a pager, a satellite television receiver, a networked stereo receiver, a computer system, music player, or virtually any other device.

FIG. 1 shows an example of the UE 100 in communication with a network controller 150, such as an enhanced Node B (eNB) or other base station. The network controller 150 and UE 100 establish communication channels such as the control channel 152 and the data channel 154, and exchange data. In this example, the UE 100 supports one or more Subscriber Identity Modules (SIMs), such as the SIM1 102 and the SIM2 104. Electrical and physical interfaces 106 and 108 connect SIM1 102 and SIM2 104 to the rest of the user equipment hardware, for example, through the system bus 110.

The UE 100 includes communication interfaces 112, system logic 114, and a user interface 118. The system logic 114 may include any combination of hardware, software, firmware, or other logic. The system logic 114 may be implemented, for example, with one or more systems on a chip (SoC), application specific integrated circuits (ASIC), discrete analog and digital circuits, and other circuitry. The system logic 114 is part of the implementation of any desired functionality in the UE 100. In that regard, the system logic 114 may include logic that facilitates, as examples, decoding and playing music and video, e.g., MP3, MP4, MPEG, AVI, FLAG, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 118. The user interface 118 and the inputs 128 may include a graphical user interface, touch sensitive display, voice or facial recognition inputs, buttons, switches, speakers and other user interface elements. Additional examples of the inputs 128 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 114 may include one or more processors 116 and memories 120. The memory 120 stores, for example, control instructions 122 that the processor 116 executes to carry out desired functionality for the UE 100. The control parameters 124 provide and specify configuration and operating options for the control instructions 122. The memory 120 may also store any BT, WiFi, 3G, or other data 126 that the UE 100 will send, or has received, through the communication interfaces 112. The UE 100 may include a power management unit integrated circuit (PMUIC) 134. In a complex device like a smartphone, the PMUIC 134 may be responsible for generating as many as thirty (30) different power supply rails 136 for the circuitry in the UE 100.

In the communication interfaces 112, Radio Frequency (RF) transmit (Tx) and receive (Rx) circuitry 130 handles transmission and reception of signals through one or more antennas 132. The communication interface 112 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 112 may include transceivers that support transmission and reception under the 2G, 3G, BT, WiFi, and 4G/Long Term Evolution (LTE) standards. The techniques described below, however, are applicable to other wireless communications technologies whether arising from the 3rd Generation Partnership Project (3GPP), GSM® Association, Universal Mobile Telecommunications System (UMTS), High Speed Packet Access (HSPA)+, or other partnerships or standards bodies.

As just one implementation example, the communication interface 112 and system logic 114 may include a BCM2091 EDGE/HSPA Multi-Mode, Multi-Band Cellular Transceiver and a BCM59056 advanced power management unit (PMU), controlled by a BCM28150 HSPA+ system-on-a-chip (SoC) baseband smartphone processer or a BCM25331 Athena™ baseband processor. These devices or other similar system solutions may be extended as described below to provide the additional functionality described below. These integrated circuits, as well as other hardware and software implementation options for the UE 100, are available from Broadcom Corporation of Irvine Calif.

Figure 2:
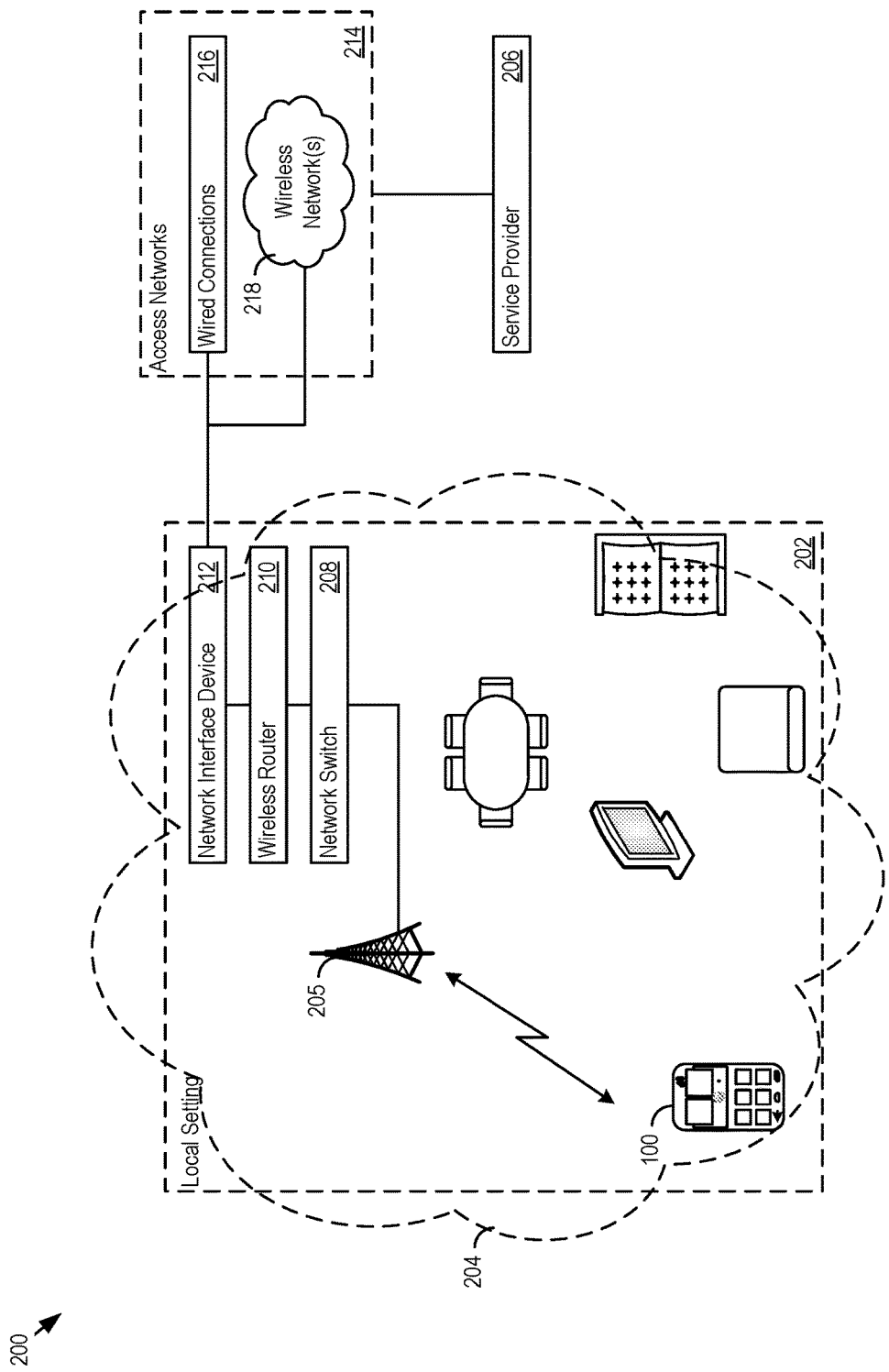
FIG. 2 shows an example architecture for a local setting with a femtocell.

FIG. 2 shows an example architecture 200 for a local setting 202 covered by a femtocell 204. A femtocell basestation 205 (e.g., a low transmit power eNB) generates the femtocell 204. The local setting 202 may be a home or office, as examples, in which one or more femtocells 204 provide cellular coverage within the local setting 202. The femtocell basestation 205 may perform the functions of a cellular basestation, for example, according to the 3GPP standard.

As just one example, the femtocell 204 may have footprint range from about 10 s to 100 s of meters, e.g., between 10 and 200 m. In a residential environment, the femtocell 204 may support, e.g., 2 to 4 active calls. The femtocell 204 increases the coverage area provided by macrocells generated by full scale outdoor base stations, and may improve data throughput and voice quality. The femtocell 204 may further reduce uplink transmission power requirements from the UE 100, because the femtocell basestation 205 is much closer, and may therefore improve the battery life of the UE 100.

In order to distinguish between a macrocell and a femtocell, the cell information broadcast by the femtocell may include a femtocell identifier and optionally a femtocell indicator flag (set to TRUE). In some cases, the femtocells may have a valid femtocell identifier and a femtocell indicator flag set to FALSE. Such cells are referred to as hybrid cells. A hybrid cell would act as a femtocell for the users authorized for connection to that femtocell and as a normal non-femtocell cell to other UEs.

Most of the broadcast (beacon) information sent by a femtocell is similar to that sent by a macrocell, except for the femtocell identifier and femtocell indicator flag mentioned above. In addition, with the introduction of femtocells, both femtocells and macrocells can optionally broadcast a list identifying known femtocell neighbor cells to help the UE 100 do cell reselection to such femtocells if the cellular radio environment warrants the reselection and if the UE 100 has a subscription to the neighboring femtocell.

The femtocell basestation 205 may connect to the service provider 206 in many different ways. In the example shown in FIG. 2, the femtocell basestation 205 connects to a port on a network switch 208. The network switch 208 connects to a wireless router 210 that also provides WiFi connectivity in the local setting 202. A network interface device 212 provides a connection to the backbone (e.g., internet service) for the local setting 202. The network interface device 212 may be a cable modem, DSL modem, T1 or T3 line, satellite transceiver, optical network interface, or other network interface device. The network interface device 212 and, therefore, the femtocell 204, connect through the access network(s) 214 to the service provider 206. The access networks may include wired connections 216, e.g., T4 or T5 lines, and wireless connections 218, e.g., microwave or satellite links.

The configuration of the femtocell 204 may include a specification of UEs that are allowed to connect to the femtocell 204 and receive service. The specification of UEs may be done in many different ways, such as by creating a whitelist of allowable phone numbers, International Mobile Station Equipment Identity (IMEI) numbers, or other identifiers. The set of UEs that have access to the femtocell 204 may therefore be closely controlled by the owner or operator of the femtocell 204. For example, in a home setting, the homeowner may configure the femtocell 204 to allow connections to the group of UEs carried by family members, friends, guests, or any other individuals. The group of UEs that have access to the femtocell 204 may be referred to as a Closed Subscriber Group (CSG).

Figure 3:
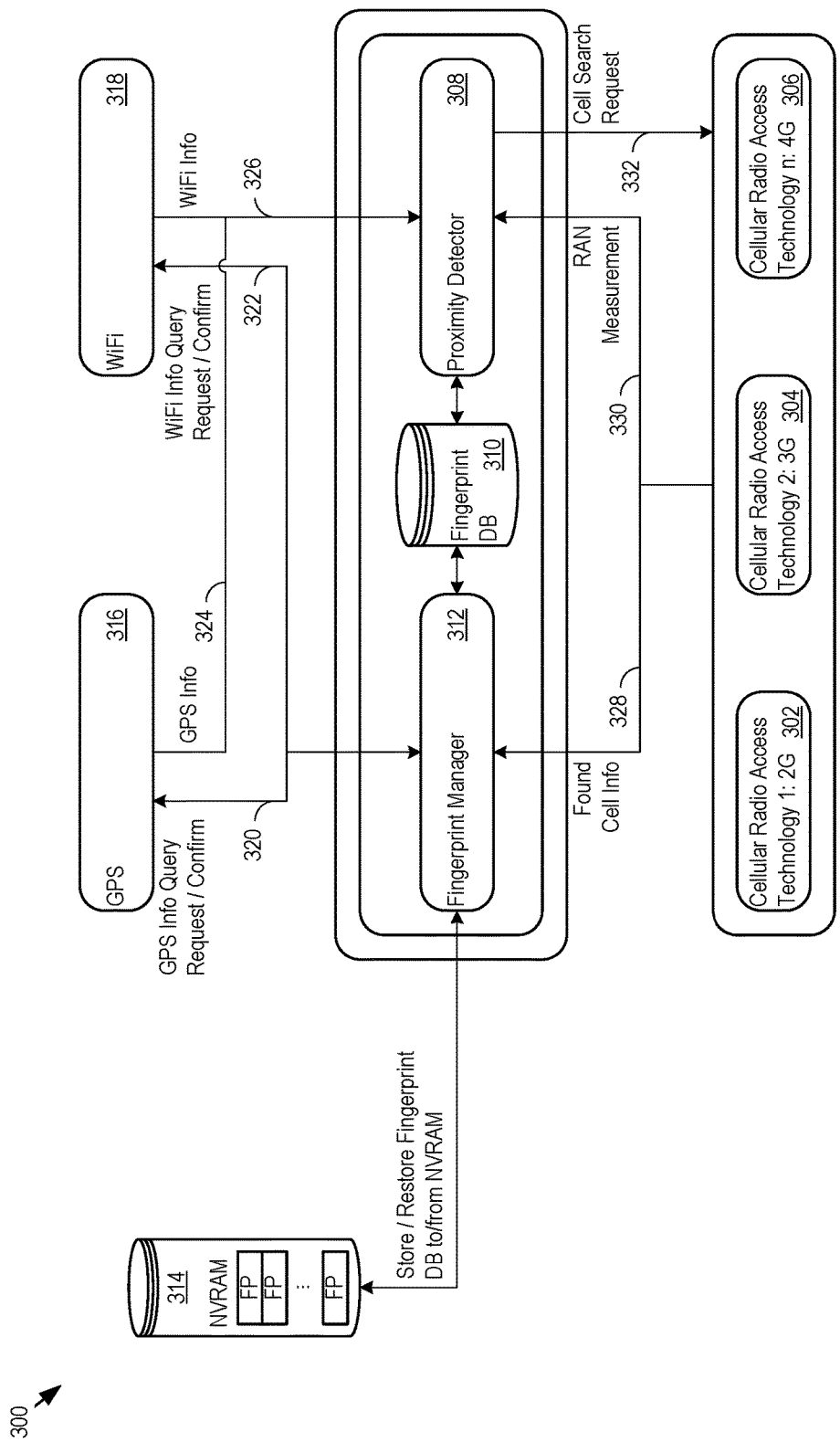
FIG. 3 shows an example fingerprinting architecture.

FIG. 3 shows an example fingerprinting architecture 300 ("architecture 300"). The architecture 300 is one example of the type of system architecture that the UE 100 may implement for creating, updating, removing and otherwise managing fingerprints. There are many other ways to implement such an architecture, and the UE 100 is not limited to the architecture 300.

Note that the operator of the UE 100 may select which cell to prioritize for future selection by the UE 100. The cell may be a femtocell. In that case, the UE 100 may record characterizing information for the femtocell from any available sources. The UE 100 employs the characterizing information to subsequently determine whether the UE 100 is proximate to the femtocell, and if so, trigger an Autonomous Search Function (ASF) in an attempt to find and connect to the femtocell. The collection of characterizing information for the femtocell may be referred to as a fingerprint for that femtocell.

The fingerprint may contain multiple components, e.g., measurement inputs, that capture the characterizing information. The fingerprint components may include, as a few examples:

Global Positioning System (GPS) position;
WiFi signal strengths in the measurable environment;
WiFi Service Set Identifiers (SSIDs) for available or connected WiFi access points in the measureable environment;
timing measurements to neighbor cells;
Radio Access Technologies (RATs) used by nearby macrocells or femtocells, e.g., whether Global System for Mobile Communications (GSM), Universal Mobile Telecommunications System (UMTS), or Long Term Evolution (LTE);
Public Land Mobile Network Identifier (PLMN ID);
Global Cell Identifier (may be useful, e.g., when physical cell IDs are reused);
cell power level and signal quality measurements;
identifying information for nearby macrocells or femtocells from which the UE 100 can receive signals;
Downlink frequency to the UE 100, as examples, an Absolute Radio Frequency Channel Number (ARFCN), a Universal Mobile Telecommunications System (UMTS)

Terrestrial Radio Access (UTRA) ARFCN (UARFCN), or Evolved Universal Terrestrial Radio Access (EUTRA) ARFCN (EARFCN);

cell Identifiers (IDs), such as the Physical Cell Identifier (PCID), Primary Scrambling Code (PSC), and Base Station Identifier Code (BSIC); Note that a cell identifier may be a scrambling code, e.g., a 3GPP scrambling code, a physical cell identifier, e.g., a LTE physical cell identifier, or another type of data that helps identify or distinguish cells, or indicate a cell type (e.g., a CSG cell type or a macrocell type);

Reference Signal Received Power (RSRP) information, e.g., the average power of Resource Elements (REs) carrying Reference Signals (RSs) over a specified bandwidth;

Received Signal Strength Indicator (RSSI) information, e.g., the received wide-band power, potentially across all received symbols and including interference and noise; and Time Delay of Arrival (TDoA) to other cells.

The UE 100 analyzes the fingerprint against measurements to determine whether the UE 100 is near a femtocell. The UE 100 may, for example, compare measurements of the environment (e.g., the currently visible SSIDs and macrocells) against the fingerprint to find a match to all or part of the fingerprint. The UE 100 may determine whether a match exists based on predetermined decision criteria that specify which parts, how much, and/or to what degree, the fingerprint components should agree with the measurements to be considered a match.

In support of fingerprinting, the architecture 300 interacts with one or more cellular RATs. In the example in FIG. 3, the RATs include a 2G RAT 302, a 3G RAT 304, and a 4G/LTE RAT 306. There may be any number or type of such RATs. The architecture 300 also includes a proximity detector 308. The proximity detector 308 may perform the analysis described above to determine whether current measurements match a fingerprint stored in the fingerprint database 310. Note that any of the RATs may return information to the fingerprint manager 312 and proximity detector 308. For example, the RATs may return cell information 328 about the macrocells and femtocells found in the vicinity, and Radio Access Network (RAN) measurements 330 that characterize the environment around the UE 100. The fingerprint manager 312 and proximity detector 308 may issue requests to the RATs as well. For example, the proximity detector 308 may initiate a cell search request 332. The cell search request 332 may be responsive to finding a matching fingerprint.

The architecture 300 also includes a fingerprint manager 312. The fingerprint manager 312 may handle the storage, recovery, addition, modification, deletion, or other management tasks on the fingerprints in the fingerprint database 310. Note that the architecture 300 may include additional storage 314 for the fingerprints, such as Non-volatile Random Access Memory (NVRAM). The fingerprints are labeled with the abbreviation 'FP' in FIG. 3.

As explained above, the fingerprints may include components of many different types. To that end, the architecture 300 may also interact with the GPS logic 316, the WiFi logic 318, or other logic. The fingerprint manager 312 may issue GPS information queries 320 or WiFi information queries 322 to the GPS logic 316 and WiFi logic 318. The GPS logic 316 and WiFi logic 318 return GPS information 324 (e.g., location coordinates or timing information) and WiFi information (e.g., SSIDs) to the proximity detector 308.

As previously explained, the proximity detector 308 may detect proximity to a previously fingerprinted cell based on one or more inputs including, as examples, RAT, WiFi, and GPS inputs. The proximity detector 308 may receive measurements periodically or on an event based basis. The proximity detector 308 may also issue measurement queries from different available component sources, such as RAT1-RATn, WiFi, and GPS. The proximity detector 308 attempts to match the measurement results against fingerprints in the fingerprint database 310 that the architecture 300 recorded for previously visited cells.

The proximity detector 308 may use the measurement inputs in a phased way. For example, the proximity detector 308 may determine a coarse match or lock based on RAN measurements. The proximity detector 308 may then obtain further measurement inputs, such as by determining whether GPS is enabled, and if so, checking proximity to a particular location specified in the fingerprint. As another example, the proximity detector 308 may determine proximity to the cell by matching a WiFi SSID, or taking additional RAN macrocell information, and may further take steps to confirm that the WiFi router has not moved or changed.

The proximity detector 308 may indicate a detection confidence level which may be used to perform a search for the cell in a power optimized way. That is, the confidence level may affect whether a search is done at all, and if so, how often and when the search is executed.

The proximity detector 308 may take into account other factors to determine whether the UE 100 will start searching for a fingerprinted cell. Examples of the other factors include cell size and velocity of travel. For instance, the proximity detector 308 may not indicate a proximity detection when a fingerprinted cell is less than a threshold size, and the UE 100 is determined to be travelling at a high speed that exceeds a speed threshold.

When the UE 100 is in Idle mode, the proximity detector 308 may trigger the currently active RAT to begin searching for (e.g., measuring) the target cell when proximity is detected. In connected mode the UE 100 may indicate proximity through signaling with the network controller 150, e.g., in the control channel 152. In connected mode, the network controller 150 may then instruct the UE 100 to attempt to connect to the target cell (the cell for which a fingerprint match was found).

The fingerprint manager 312 may add, remove, and update fingerprints based on various inputs. The inputs may include, as examples: failure to find a fingerprinted cell after search is triggered, successful reselection to fingerprinted cell, and the time to find fingerprinted cell after search is triggered.

The fingerprint manager 312 may update fingerprints wholly or partially. For instance, the fingerprint manager 312 may update, delete, or add measurements for some macrocells without affecting other components in the fingerprint. The fingerprint manager 312 may generate a fingerprint when the UE 100 enters a femtocell. In that regard, the fingerprint manager 312 may execute, for example, a full network scan to determine visible macrocells in all RATs, and, if available, WiFi, and GPS measurements. As another example, the fingerprint manager 312 may generate the fingerprint from neighbor cell measurements that the UE 100 performs as part of its normal housekeeping operations for maintaining cell connectivity, prior to reselecting to the fingerprinted cell.

The architecture 300 may use the native RAT for the matched fingerprinted cell to perform the search for the matched cell. That is, the RAT (or any other search logic) may attempt to find the matched cell when the proximity detector 308 instructs it to do so. In that regard, the RAT may scan the frequencies associated with the matched cell in an attempt to find transmissions from the matched cell.

The RAT may take into account the proximity detection confidence level indicated by the proximity detector 308 when determining whether, when, and how often to search. For instance, a lower confidence may result in a less frequent search, helping to preserve battery life.

To confirm that the detected transmissions originate from a cell that is in fact the cell that the UE 100 is searching for, the search logic may acquire system information from the target cell. The UE 100 may do so while still camped on an existing serving cell. For instance, the UE 100 may perform background System Information Block (SIB) acquisition. The SIBs provide identifying information for the transmitting cell. The UE 100 may ensure that the cell identity matches that of the fingerprinted cell. This may help to avoid frequent failed reselection attempts. The UE 100 may also use this pre-emptive SIB acquisition to determine that the target cell meets any specified suitability criteria before the cell reselection attempt is performed, by checking SIB data against the criteria.

Alternatively, the UE 100 may choose to not perform background SIB acquisition. Instead, the UE 100 may trigger cell reselection directly without prior confirmation that the measured cell is the correct preferred cell. In this case the UE 100 may store cell selection parameters (e.g., from the system information) as part of the fingerprint when initially fingerprinting the cell. The UE 100 may use these parameters to perform pre-suitability-checking of the target cell before deciding whether a cell reselection will be performed. If the UE 100 decides to reselect and subsequently discovers that the cell is actually not the correct cell, e.g., based on checking the cell identity, Public Land Mobile Network (PLMN) indicator, or other information, the UE 100 may bar this cell from future connection attempts. The bar may last, e.g., for as long as the cell remains visible or for a predetermined time.

Phased Search Techniques

In, e.g., Idle mode, the UE 100 may perform a search for femtocells in a phased manner. As noted above, the proximity detector 308 may find that the UE 100 is in proximity to a known femtocell. The proximity detector may then trigger the ASF in an attempt to locate and connect to the femtocell. As explained in more detail below, the phased search may center around a search to find the expected frequency (F1) and cell identifier (CID). The cell identifier may be a physical cell identifier for a 4G femtocell, a primary scrambling code for a 3G femtocell, or another type of cell identifier for a different RAT. The frequency, cell identifier, and RAT may have been stored as part of the fingerprint for the femtocell was the femtocell was originally located.

The phased search may include the following phases, each of which will be described in more detail below. In the description below, RRC refers to Radio Resource Control. The RRC may, for example, be implemented as a software/firmware layer in communication with the PHY layer to receive PHY measurements and implement the phased search strategy. The ASF and proximity detector 308 may call the RRC to perform the search when the proximity detector 308 determines that the UE 100 may be near a femtocell. There are many different way to implement the entities involved, and as one example, the ASF and proximity detector 308 may be control entities in a higher layer, e.g., an application layer or transport layer, while the RRC may be a software/firmware layer at the network layer, and the PHY may be a physical layer entity. There may be similar entities for any RAT, whether 3G, 4G, or otherwise.

The description below is applicable across the entities implemented for any particular RATS, and the phased search may be implemented by different entities implemented in many different ways throughout the UE 100.

Phase 1: for time T1, the RRC searches for the femtocell specifically by attempting locating CID on F1. The RRC and PHY may efficiently search by performing relatively fast analog signal strength measurements to determine if a nearby cell is generating energy on F1, and also by a relatively fast correlation procedure that determines whether the CID is associated with F1.

If the RRC does not find the cell at F1 and CID, then the RRC assumes the proximity detection is correct but that the femtocell parameters have changed since the femtocell was last selected.

Phase 2: The RRC may search F1 for time T2, assuming that only the CID has changed. That is, the RRC may search F1 for some or all possible CIDs (e.g., the 512 3G scrambling codes, or 504 cell IDs in 4G) in an attempt to find the femtocell. The assumption that the CID has changed matches typical or expected real-world behavior of femtocells, which when powered on, and also periodically, search for interference and reconfigure to avoid that interference, e.g., by changing their CID, and less often their frequency.

Phase 3: If RRC does not find the femtocell on F1 during T2, then RRC may search additional frequencies. For instance, the RRC may search all supported frequencies which are present in the system information of the currently camped cell across some or all CIDs.

The RRC may search other RATs if desired, but because the femtocell RAT is unlikely to change, RRC may omit searching other RATs.

Figure 4:
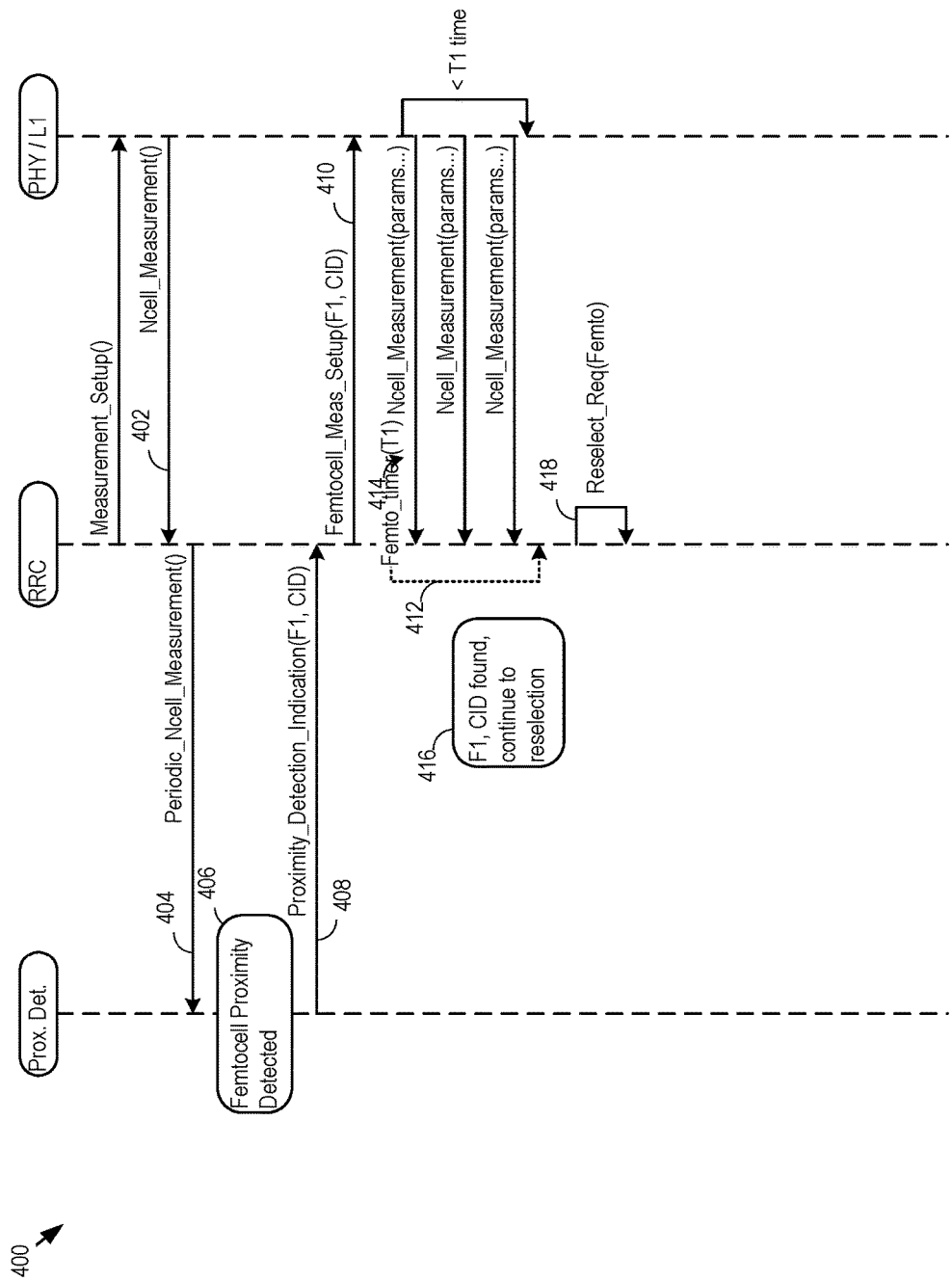
FIG. 4 shows example logic that user equipment may implement for performing part of a phased search.

FIG. 4 shows logic for 400 that the UE 100 may implement for search phase 1. As part of the normal Idle mode measurements, the RRC receives from the PHY neighbor cell measurements (402). The RRC returns the measurements to the proximity detector 308 (404), and the proximity detector 308 may compare the measurements to the fingerprints and determine that the UE 100 is proximate to a femtocell (406) on frequency F1 and cell ID CID.

The proximity detector 308 signals proximity detection to the RRC (408). The RRC responds by setting up measurements with the PHY, e.g., for F1 and CID (410). Also, the RRC may start a timer T1 during which the RRC will receive cell measurements from the PHY (412). Within the time T1, the PHY performs measurements of the radio environment, and returns the measurements to the RRC (414). The measurements may be in the form of [f1$p$1, f2$p$2, . . . ], representing frequency and cell identifier (e.g., primary scrambling codes) that identify a cell. These measurements may include the Idle mode reselection measurements for neighbor cells that the PHY would ordinarily make in Idle mode, in addition to the specifically requested (e.g., F1, CID) cell measurements. In the example of FIG. 4, one of the measurements verifies that the PHY has found CID on F1 (416). In that event, the RRC may attempt reselection to the femtocell on F1 with CID (418).

Figure 5:
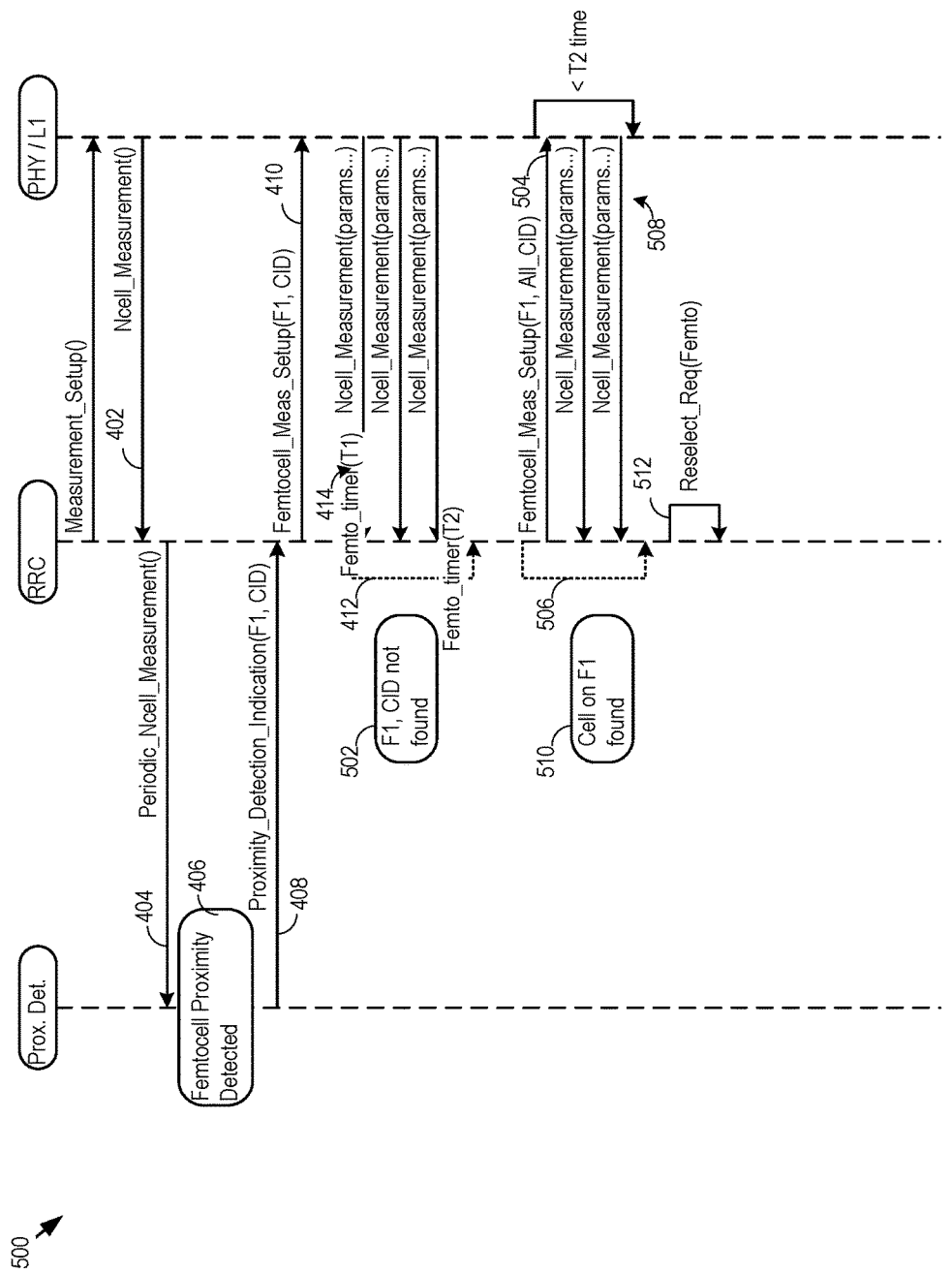
FIG. 5 shows example logic that user equipment may implement for performing part of a phased search.

FIG. 5 shows logic for 500 that the UE 100 may implement for search phase 2. In FIG. 5, the logic 500 does not find the femtocell on F1 and CID (502). As a result, the logic 500 initiates a search for the femtocell on F1, but across some or all CIDs (504). For example, the RRC may instruct the PHY to report whether the PHY can find any cells on F1 that match any of the scrambling codes used for the particular RAT to which the femtocell belongs. The RRC may set a timer of duration T2, during which the search occurs (506).

The PHY returns measurements of the radio environment (508). The RRC may find that in fact the PHY has measured a cell on frequency F1 with a particular cell ID (510). If there are multiple cells found on F1 with different cell IDs, then the RRC may select the strongest cell by signal strength, for instance, or may apply a different decision criteria to select from among the multiple cells that were located. Then RRC may then reselect to the femtocell on F1 with the particular CID that was found (512).

As part of reselection, because the CID is different, the UE 100 may read the system information from the selected cell. The system information may provide additional fingerprint information to compare against the fingerprint for the desired femtocell. As an example, the system information may provide a specific cell identifier that the UE 100 tests for a match against the fingerprint. The specific cell identifier may confirm that the located cell is indeed the femtocell that the UE 100 is trying to locate based on the proximity detection.

Figure 6:
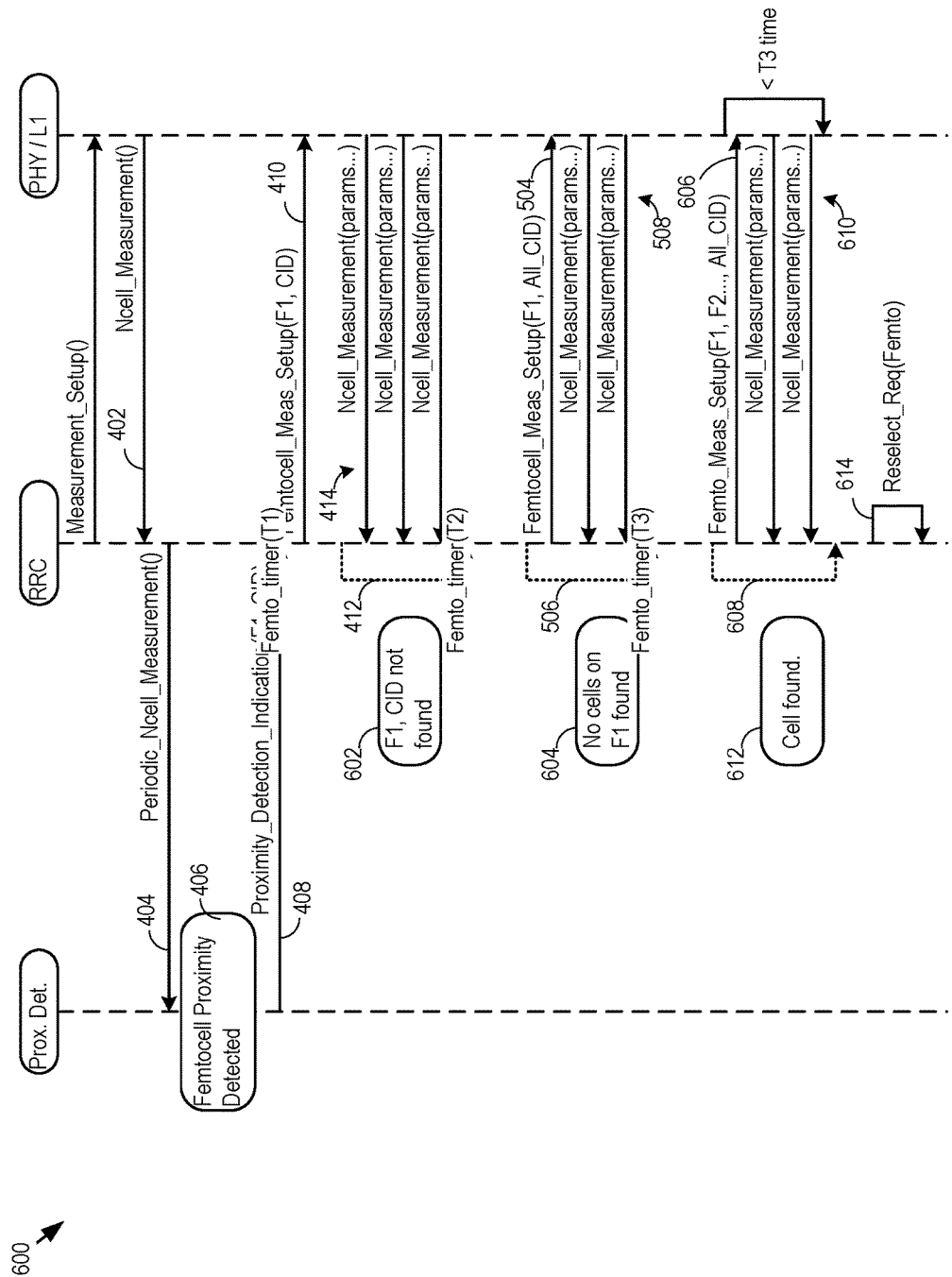
FIG. 6 shows example logic that user equipment may implement for performing part of a phased search.

FIG. 6 shows example logic 600 that the UE 100 may implement for performing search phase 3. That is, FIG. 6 shows the scenario in which the UE 100 has not found the femtocell that it believes is nearby, either on F1, CID specifically (602), or on any cell ID on F1 (604). In phase 3, the RRC instructs the PHY to search over some or all cell IDs, over specified frequencies F1, F2, . . . (606).

While the specified frequencies could be all the frequencies supported by the RAT, the RRC may instead request the PHY to search the set of frequencies obtained from the system information provided by the camped cell, or some other set of frequencies. In one implementation, the UE 100 may obtain cell information for intra-frequency and inter-frequency neighbor cells from one or more of the System Information Block (SIB) 11, SIB11.bis, SIB12, and SIB19, including dedicated femtocell frequencies. The UE 100 may obtain cell information from other system blocks or in other ways, however. The RRC may then instruct the PHY to search on some or all of the particular frequencies for the cells specified in the system information blocks, e.g., the superset of frequencies found in the system information blocks.

The RRC may start a timer T3 during which the RRC will receive cell measurements from the PHY (608). During the time T3, the PHY performs measurements of the radio environment, and returns the measurements to the RRC (610). In the example of FIG. 6, one of the measurements verifies that the PHY has found a cell on a particular cell ID and frequency (612). If there are multiple cells found with different cell IDs and frequencies, then the RRC may select the strongest cell by signal strength, for instance, or may apply a different decision criteria to select from among the multiple cells that were located. The RRC performs reselection to the selected femtocell (614).

Note that the reselection will verify whether the cell that was located is indeed the expected femtocell. If it is, the UE 100 may then camp on the femtocell and optionally update the fingerprint for the femtocell to match the frequency and cell ID that were found. Otherwise, the UE 100 does not camp onto the new cell, but may instead continue camped on the current serving cell.

Figure 7:
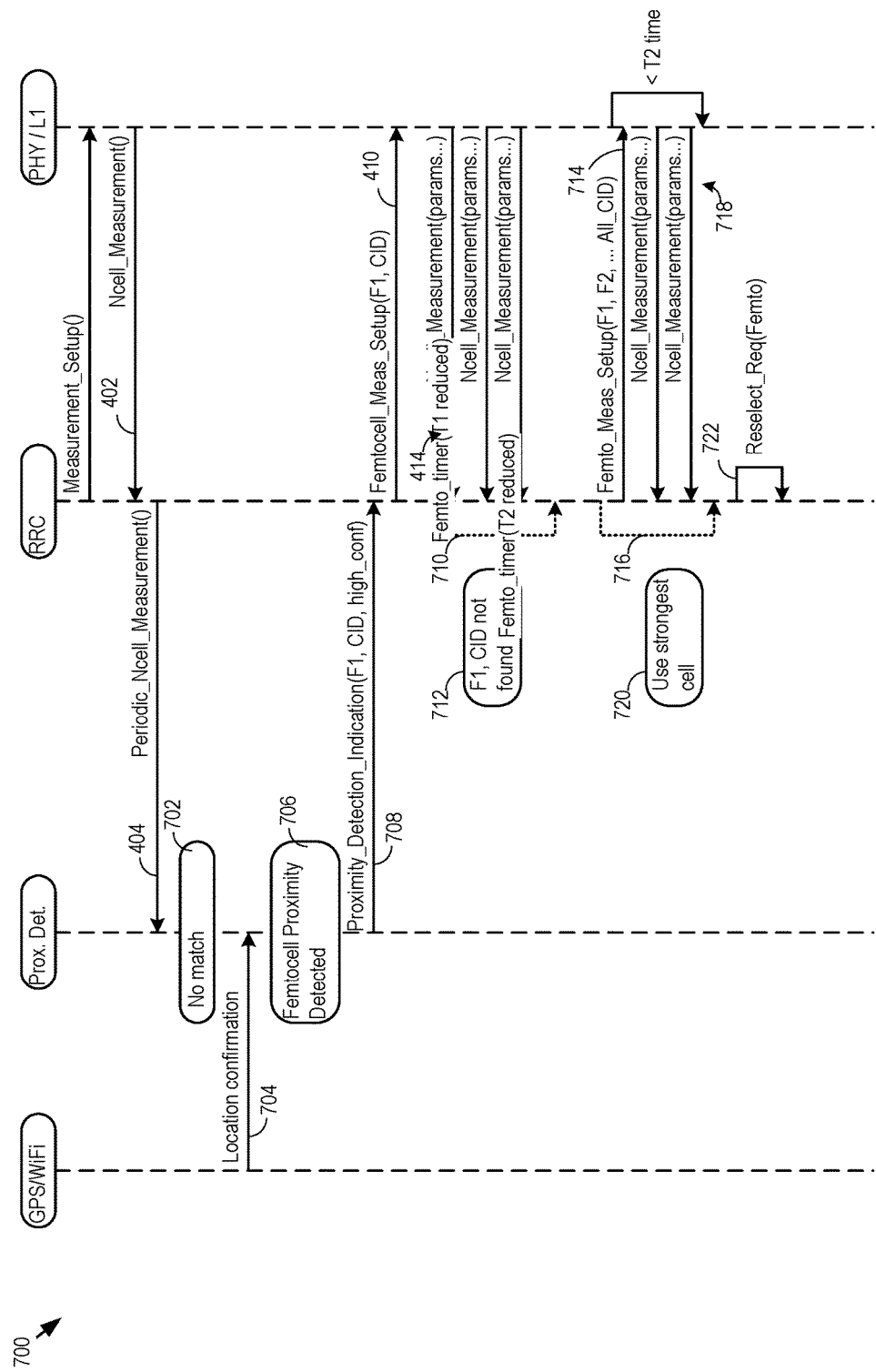
FIG. 7 shows example logic that user equipment may implement for performing a phased search.

Figure shows another example of logic 700 for performing a phased search. In other implementations, as shown in FIG. 7, the phased search is influenced by the accuracy of location information. Note that if the ASF triggers too far from the femtocell (e.g., 100 s of meters), the UE 100 may spend too much time or energy trying to locate the distant femtocell. Accordingly, the UE 100 may inform the RRC with additional information about proximity to or confidence of being near the femtocell for which the proximity detector 308 matched the fingerprint.

More specifically, when the ASF is triggered in response to measurements of macrocells in the fingerprint for the femtocell, then the phased search may proceed as noted above and with respect to FIGS. 4-6. These measurements may indicate a relatively coarse indication of proximity to the femtocell.

However, as shown in FIG. 7, the macrocell measurements may not indicate a match (702), however, the proximity detector 308 may also request and obtain more accurate location measurements, e.g., GPS position measurements from the GPS logic 316, or position information from the WiFi logic 318 (704). In that situation, the proximity detector 308 may have increased confidence that the UE 100 is indeed nearby the femtocell, e.g., within a predefined distance threshold of the femtocell (e.g., less than 20 meters) (706). The proximity detector 308 may thus issue the proximity detection 708 to the RRC, specifying high location confidence.

Given more reliable position information, the phased search may start with the phase 1 search for the femtocell on F1 and CID, e.g., (410) and (414) during a time period T1 which may be reduced or eliminated due to the high location confidence (710). However, if the femtocell is not located on F1 and CID, then the phased search may instead search for and select the strongest cell visible (714) over all or some selected frequencies (e.g., the SIB11 and SIB12 frequencies).

The measurements 716 may run over a timer T2 (716), which may be reduced due to the increased confidence in proximity to the femtocell. The measurements return from the PHY (718). The strongest cell visible is likely to be the femtocell (with a new configuration, e.g., cell ID or frequency), given the increased confidence in the UE 100 location provided by the GPS logic 316 or WiFi logic 318. The logic 700 may then select the strongest visible cell (720) (or any other cell that was located if other selection criteria are used) and attempt reselection to the selected cell (722).

In other implementations, the timers T1, T2, or T3 may be adjusted responsive to fingerprint match certainty. For instance, the RRC may lengthen timer T1 if only a partial fingerprint match was made to the femtocell. More generally, a timer, such as T1, may increase in duration as the confidence level in the fingerprint match decreases.

Regarding the timers, the ASF may be exposed to coarse proximity detections due to rain fade, interference, and other factors. The timers help the UE 100 to find the femtocell, even if it has changed its parameters. The search for a length of time (e.g., T1, T2, or T3) helps to cover scenarios of uncertainty in, e.g., location where, for instance, ASF was triggered early, but the UE 100 is moving toward the femtocell. In these scenarios, it is may be profitable to search for a particular length of time before moving to subsequent search phases. The timers may be adaptive, and the RRC may change the timers to recognize prior successes and failures in finding the femtocell, e.g., by staring timer T1 with a relatively large value, and reducing timer T1 in response to successful locations of the femtocell within the time T1.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

Various implementations have been specifically described. However, many other implementations are also possible.

What is claimed is:

1. A method comprising:
    determining that a device is within a redefined distance threshold of a femtocell; and
    executing a phased search for the femtocell, the phased search comprising:
        a first phase that searches an expected femtocell frequency and expected femtocell identifier; and
        a second phase executed when the first phase fails, the second phase comprising searching for the femtocell by modifying the first phase according to a first expected behavior of the femtocell; and
    setting a search timer for searching the expected femtocell frequency and expected femtocell identifier to a shorter time period than used when the device is not determined to be within the predefined distance threshold.

2. The method of claim 1, where:
    the expected behavior comprises a change in cell identifier.

3. The method of claim 2, where:
    the cell identifier comprises a physical cell identifier.

4. The method of claim 2, where:
    the cell identifier comprises a primary scrambling code.

5. The method of claim 2, further comprising:
    attempting reselection to the femtocell using the change in cell identifier and expected femtocell frequency.

6. The method of claim 1, where the phase search further comprises:
    a third phase that searches for the femtocell by modifying the second phase according to a second expected behavior of the femtocell.

7. The method of claim 6, where:
    the second expected behavior compress a change in frequency.

8. The method of claim 7, further comprising:
    obtaining system information from a currently camped cell; and
    limiting the change in frequency to a set of frequencies obtained from the system information.

9. The method of claim 8, further comprising:
    executing the third phase over the set of frequencies and allowable cell identifiers for the frequencies in the set of frequencies.

10. A system comprising:
    a radio frequency (RF) communication interface; and
    circuitry in communication with the RF communication interface, the circuitry configured to:
        match environmental measurements to a fingerprint for a femtocell;
        determine an expected frequency and cell identifier for the femtocell;
        obtain location information that locates the system to within a predefined distance threshold of the femtocell;
        initiate a phase one search for the femtocell on the expected frequency and cell identifier; and
        responsive to the location information, set a search timer for the phase one search by setting the search timer for a shorter time period than the location information does not locate the system to within the predefined distance threshold; and
    if the phase one search fails, execute a phase two search comprising a search modification to the phase one search, responsive to expected behavior of the femtocell.

11. The system of claim 10, where:
    the search modification to the phase one search comprises a change in the cell identifier.

12. The system of claim 10, where the circuitry is further configured to:
    if the phase two search fails, execute a phase three search comprising a search modification to the phase two search, responsive to expected behavior of the femtocell.

13. The system of claim 12, where:
    the search modification to the phase two search comprises a change in the expected frequency.

14. The system of claim 13, where the circuitry is further configured to:
    obtain system information from a currently camped cell; and
    limit the change in expected frequency to a set of frequencies obtained from the system information.

15. The system of claim 10, where:
    the location information comprises macrocell measurements.

16. The system of claim 10, where:
    the location information comprises satellite positioning information or wireless network location information, or both.

17. The system of claim 10, where the circuitry is further configured to adjust, relative to a complete match, a duration of the search timer responsive to a partial match between the environmental measurements and the fingerprint.

18. A system comprising:
    a radio frequency (RF) communication interface;
    a fingerprint database comprising:
        a frequency fingerprint component for a femtocell;
        a cell identifier fingerprint component for the femtocell; and
        macrocell measurements for the femtocell;
    a proximity detector in communication with the fingerprint database and operable to:
        obtain environmental macrocell measurements from the RF communication interface;

responsive to the environmental macrocell measurements, determine that the system is located within a predefined distance threshold of the femtocell; and initiate a search for the femtocell; and circuitry in communication with the RF communication interface, the circuitry configured to:
receive the frequency fingerprint component and cell identifier fingerprint component for the femtocell;
initiate a first search phase that attempts to locate the femtocell as specified by the frequency fingerprint component and cell identifier fingerprint component;
set a search timer for the first search phase by setting the search timer for a shorter time period than when the system is not located within the predefined distance threshold;
if the first search phase fails, execute a second search phase that attempts to locate the femtocell at a different cell identifier;
if the second search phase fails, execute a third search phase that attempts to locate the femtocell at a different frequency; and
when there is a positive search result, attempt to camp onto the femtocell according to search parameters giving rise to the positive search result.

19. The system of claim 18, where the circuitry is further configured to:
obtain system information from a currently camped cell; and
limit the different frequency to a frequency specified in the system information.

20. The system of claim 18, where the environmental macrocell measurements comprise a signal strength measurement for a neighbor macrocell.

* * * * *